US012248653B2

(12) United States Patent
Klahm (10) Patent No.: US 12,248,653 B2
(45) Date of Patent: Mar. 11, 2025

(54) ADAPTABLE GUI FOR DASHBOARD SOFTWARE

(71) Applicant: BASF COATINGS GMBH, Münster (DE)

(72) Inventor: Sebastian Klahm, Münster (DE)

(73) Assignee: BASF COATINGS GMBH, Muenster (DE)

( * ) Notice: Subject to any disclaimer, the term of this patent is extended or adjusted under 35 U.S.C. 154(b) by 28 days.

(21) Appl. No.: 17/998,462

(22) PCT Filed: May 4, 2021

(86) PCT No.: PCT/EP2021/061765
§ 371 (c)(1),
(2) Date: Nov. 10, 2022

(87) PCT Pub. No.: WO2021/228632
PCT Pub. Date: Nov. 18, 2021

(65) Prior Publication Data
US 2023/0176706 A1 Jun. 8, 2023

(30) Foreign Application Priority Data
May 11, 2020 (EP) .................................. 20173995

(51) Int. Cl.
*G06F 3/04812* (2022.01)
(52) U.S. Cl.
CPC ................ *G06F 3/04812* (2013.01)
(58) Field of Classification Search
CPC ....... G06F 3/04812; G06F 2203/04803; G06F 3/0487; G06F 3/048
See application file for complete search history.

(56) References Cited

U.S. PATENT DOCUMENTS

| | | | | |
|---|---|---|---|---|
| 5,416,890 A | * | 5/1995 | Beretta | H04N 1/6058 345/590 |
| 5,644,737 A | * | 7/1997 | Tuniman | G06F 3/0481 715/810 |
| 6,874,128 B1 | * | 3/2005 | Moore | G06F 3/0486 715/788 |
| 8,782,026 B2 | | 7/2014 | Poland et al. | |
| 9,292,182 B2 | | 3/2016 | Chmiel et al. | |
| 2002/0191028 A1 | * | 12/2002 | Senechalle | G06F 3/0481 715/800 |
| 2014/0195953 A1 | * | 7/2014 | Sakai | G06F 3/017 715/771 |

(Continued)

FOREIGN PATENT DOCUMENTS

| | | | |
|---|---|---|---|
| JP | 2013161407 A | 8/2013 | |
| JP | 201892254 A | 6/2018 | |
| WO | WO-0225420 A1 * | 3/2002 | ............ G06F 3/0481 |

OTHER PUBLICATIONS

International Search Report and Written Opinion for corresponding PCT/EP2021/061765 mailed Jul. 12, 2021, 9 pages.

(Continued)

*Primary Examiner* — Jeanette J Parker
(74) *Attorney, Agent, or Firm* — Armstrong Teasdale LLP (57) ABSTRACT

Disclosed herein is a graphical user interface (GUI) for a colorimetry software product, a computer-implemented method for generating the GUI, and a system for performing the method.

12 Claims, 3 Drawing Sheets

(56) References Cited

U.S. PATENT DOCUMENTS

2014/0337794 A1    11/2014  Vranjes et al.
2016/0139750 A1*   5/2016  Barrus .................. G06F 3/0481
                                                        715/777

OTHER PUBLICATIONS

"Windows Terminal" is under development, and it will now be possible to split multiple panes in a tab and use Japanese IME, https://atmarkit.itmedia.co.jp/ait/articles/2001/09/news012.html.

* cited by examiner

ADAPTABLE GUI FOR DASHBOARD SOFTWARE

CROSS-REFERENCE TO RELATED APPLICATIONS

This application is a U.S. National Phase Application of International Patent Application No. PCT/EP2021/061765, filed May 4, 2021, which claims priority to European Patent Application No. 20173995.0, filed May 11, 2020, each of which is hereby incorporated by reference herein.

FIELD OF THE INVENTION

The present disclosure concerns a graphical user interface (GUI) for a dashboard software product, e.g., a colorimetry software product, a computer-implemented method for generating the GUI, and a system for performing the method.

BACKGROUND OF THE INVENTION

In automotive coating lines, it is important to achieve a color-identical painting of car bodies and attached parts. To ensure compliance regarding batch consistency and production consistency, and to guarantee that the color specifications and tolerances of colorimetric properties are met, software tools have been developed for the support of the quality management of the production process.

An example is the ColorCARE® software developed by BASF Coatings, in particular, the ColorCARE® Toolbox. The software enables ongoing monitoring of the color matching between bodies and add-on parts, such as hatches, rear-view mirrors or door handles. The software combines instrument-based colorimetry with analytical methods and converts this statistical data into graphics and indicates deviations.

The software must generate graphical user interfaces (GUIs) that fit within a visual display of the computing device on which it is executed to display information to the application user. Depending on the specific application and the information to be examined by the user, a multitude of different and varying data objects needs to be displayed. There is a need to provide a computer-implemented method and a computer system allowing a user to configure a GUI layout with a maximum of flexibility for a maximum of usability.

EP 2 930 613 A1 describes methods, systems, and computer program products for generating user interface layouts. One computer-implemented method includes dividing an available vertical space associated with a graphical user interface into a plurality of allowed vertical space allocations based on a priority of a plurality of data display fields, calculating, by a computer, slack following each data display field expanding to fill an allowed vertical space allocation associated with the data display fields, allocating the slack among the plurality of data display fields, re-calculating, by a computer, slack following allocation of slack among the plurality of data display fields, and finalizing display of the plurality of data display elements in the graphical user interface.

U.S. Pat. No. 6,874,128 B1 discloses a mouse driven splitter program and algorithm. A method of splitting a display window comprises dragging a cursor from a begin point in the display window to an end point in the display window; and dividing the display window into two separate split display windows, each of said separate split display windows having a newly-formed edge substantially aligned with a line that would pass through the begin and end points. A scrollable list box associated with each of the split display windows is provided, each list box containing one or more display options for display in the associated window; and one of the display options is selected for display for each of the split display windows; and a visual display associated with the selected display option is displayed within each of the split display windows.

WO 02/25420 A1 discloses a views management system having a computer display which provides a hideable view bar having pane splitting controls and a list of open views. Through selection of specific ones of the pane splitting controls, a system user can configure the display to show any number and arrangement of tiled views. By simply selecting one of the open views in the list appearing in the view bar, the user can assign that view to the pane currently having focus. The contents of pairs of panes can easily be swapped by a click-drag-drop operation sequence using a cursor-controlling pointing device.

SUMMARY OF THE INVENTION

The present disclosure relates to computer-implemented methods, computer-readable media, and computer systems for generating graphical user interface layouts. There is provided a computer-implemented method, a computer-readable medium storing computer-readable instructions, and a system as defined in claims 1, 14 and 15. Further embodiments are set forth in the dependent claims.

DETAILED DESCRIPTION

The present disclosure provides a computer-implemented method for generating a graphical user interface (GUI) for a dashboard software product. The method comprises the steps of:
  a) receiving an input selecting an available (sub)area on a display associated with the GUI;
  b) receiving a binary input consisting of a selection whether the (sub)area is to be divided horizontally or vertically;
  c) depending on the selection made in step b), dividing the (sub)area either horizontally or vertically into two subareas having a pre-defined area ratio;
  d) repeating steps a) through c) until a desired grid has been obtained;
  e) assigning at least one data object provided by the dashboard software to at least one subarea of the grid obtained in step d);
  f) displaying the data objects in the assigned subareas.

In the context of the present disclosure, a dashboard software product is software which needs to display and control a multitude of different and varying data objects. Examples include trading software applications, e.g., for trading stocks, bonds, options, currencies, goods etc.; software applications in the health sector for monitoring a plurality of vital parameters of a patient like pulse rate, blood pressure, breathing frequency, oxygen saturation, heart rhythm, brain waves etc.; and tools for testing and/or monitoring machines; e.g., engines, which monitor and/or control exhaust parameters, pressure, liquid flow, gas flow, voltages, currents, power, torque, temperature, rotational speed etc. In a particular embodiment, the dashboard software is a colorimetry software product.

In one embodiment of the method, the input is received from a user via an input device, such as a keyboard, a computer mouse, a trackball, or a touchscreen. The user selects an available (sub)area on a display associated with the GUI and whether the (sub)area is to be divided horizontally or vertically.

In one embodiment of the method, the (sub)area in step a) is selected by navigating a cursor into the (sub)area. In a particular embodiment using a computer mouse or a trackball as an input device, a pointer is moved into the (sub)area to select it. In another particular embodiment using a touchscreen as an input device, the (sub)area in step a) is selected by touching the touchscreen in the respective (sub)area. In a further embodiment, short cuts can be used to navigate to the respective (sub)area.

In step b) of the method, a binary input is received. The binary input consists of a selection whether the (sub)area is to be divided horizontally or vertically. In other words, the binary input is a single piece of information which can only take one of two expressions, one signifying "divide horizontally", the other signifying "divide vertically". The binary input does not comprise information on the position at which the (sub)area is to be divided. In other words, no information on the exact position of the split is contained in the binary input.

In one embodiment of the method, the selection in step b) is made by navigating a cursor into the (sub)area as previously described and generating a first predefined binary input to select horizontal division of the (sub)area, or a second predefined binary input to select vertical division of the (sub)area. The predefined binary input is a programmed binary input, such as a mouse click, a touchscreen gesture, a short cut or a combination thereof. In one example, the selection in step b) is made by navigating a cursor into the (sub)area using a computer mouse (or a trackball), and performing a left mouse-click to select horizontal division of the (sub)area or a right mouse-click to select vertical division of the (sub)area. In another example, the selection in step b) is made by navigating a cursor into the (sub)area using a computer mouse (or a trackball), and performing a right mouse-click to select horizontal division of the (sub)area or a left mouse-click to select vertical division of the (sub)area.

In step c), the (sub)area is divided into two subareas having a pre-defined area ratio. The predefined area ratio can be any ratio x:y with $0<x<1$, $0<y<1$ and $x+y=1$. In a particular embodiment, the predefined ratio is 0.5:0.5, i.e., the two subareas obtained by the division are commensurate.

Steps a) through c) are repeated until a desired grid for the GUI has been obtained. This allows for the generation of a flexible GUI using a recursive algorithm. Said algorithm allows the user to vertically and/or horizontally divide the GUI as desired, making it possible to divide a display area into an arbitrarily clustered amount of subareas to position arbitrary subwindows (e.g. charts, tables, etc.) within these subareas. A click inserts a subarea which in turn offers the possibility to place two new subareas, and so on. As long as the user continues clicking (left/right), further subareas are created. The final grid is comprised of a plurality of rectangular subareas.

In an embodiment of the method, steps a) through c) can be undone or redone, as long as no data object has been assigned to the (sub)area. Undoing or redoing can triggered by any type of predefined binary input (=back or forth), such as via mouse, touch, short cut. In one embodiment, steps a) through c) can be undone or redone by scrolling on a mouse wheel of a computer mouse. This "history" function tracks the selections made by a user, e.g., the left mouse-clicks and right mouse-clicks, and allows the user to undo any selections that he/she is not satisfied with, by scrolling backwards on the mouse wheel. If the user has moved too far back in the selection history, steps can be redone by scrolling forwards on the mouse wheel. However, once the user has assigned a data object to a (sub)area, the history function is no longer available; and the previous changes to the grid cannot be undone by scrolling on the mouse wheel. This is due to the fact that the generation of the grid is finished. After finishing the grid, it is only possible to assign data object type(s) and/or to change the area ratio.

The grid of the GUI is supposed to be as flexible as possible and its generation requires minimal input from the user; the only information required being: start, divide horizontal/vertical, finish.

In one embodiment of the method, the boundaries of each subarea of the grid obtained in step d) can be moved to modify the grid, i.e., the subareas of the (finished) grid are modifiable in width and length. In a particular embodiment, a boundary of a subarea is moved using a computer mouse (or a trackball) by pointing and clicking on the boundary to select it and then dragging the pointer to the desired position.

After having obtained the desired grid in step d), data object type(s) provided by the dashboard software is/are assigned to subarea(s) of the grid obtained in step d). The data object types can be of the same or different data object type. More than one data object type can be assigned to a subarea. Also, the same data object type can be assigned to more than one subarea. In one embodiment, at least one data object is assigned to each of the subareas of the grid obtained in step d).

In another embodiment, each subarea of the grid obtained is assigned to at least one data object type provided by the dashboard software. Once the grid generation has been completed, all subareas can be used to place data object types. Each and every subarea has a bidirectional information mechanism (having n+1 members in its chain, where n is the depth of the respective subarea) which enables the developer to bundle all information about all subareas in one place and—on the other hand—send information to each of the subareas from any desired location. In one embodiment, an input button is provided in each subarea of the grid for the selection of the at least one data object type to be assigned to and displayed in the respective subarea. A single data object type can be assigned to and displayed in more than one subarea. Once a data object type has been assigned to a subarea, the subarea contains an instance of the respective assigned data object type. This allows assigning data object types of the same type, but with different contents, or data object types with the same content, to either the same or different subareas.

In one embodiment of the method, the data objects types are selected from the group consisting of numbers, text, symbols, tables, diagrams, and pictures. In a further embodiment, the data objects represent measured data obtained by the dashboard software, e.g., a colorimetry software product.

In one embodiment of the method, an assigned data object can be freely moved from one subarea to another subarea, e.g., by drag-and-drop. In a further embodiment, wherein more than one data object is assigned to a single subarea, the order of the data objects displayed in the respective subarea can be altered at will, e.g., by a drag-and-drop mechanism, which moves the respective data object to a different position in the list of data objects assigned to the respective subarea.

In one embodiment of the method, the finished grid is storable, i.e., it can be transferred to another GUI or be reloaded. For this purpose, the input used to generate the grid is stored on a data storage medium and can be retrieved upon reloading of the grid. The input used to generate the grid may be reduced by removing unnecessary inputs, such as redundant inputs performed during generation of the grid, in order to limit the series of inputs which need to be stored to an optimized minimum. This allows reducing the amount of data which needs to be stored for transferring or reloading the finished grid to a minimum. In another embodiment of the method, the finished grid is persistent.

In one embodiment of the method further involves
- g) grouping at least two of the data objects; and
- h) highlighting the group of data objects with a common color and/or numbering.

Grouping of data objects allows displaying different data objects related to the same topic in different subareas. This provides a better overview of all data available for a specific topic.

In one embodiment, the GUI comprises, in addition to the grid of subareas, a quick start button bar which can get pinned at an arbitrary position at an edge of the display. In a particular embodiment, the quick start button bar can also float in and float out from the position when it's not pinned. In a further embodiment, buttons activating different functions can be added and removed to the quick start button bar via drag and drop.

In one embodiment, the GUI includes a standard header, a standard footer, and the two main components in terms of flexibility, i.e., a quick start button bar and a custom grid which includes views like charts, tables and reports (etc.). The grid meets the need to design arbitrary rectangular subareas where different views can be positioned, the size of the subareas being customizable.

The present disclosure also provides a non-transitory, computer-readable medium storing computer-readable instructions executable by a computer and operable to:
- a) receive an input selecting an available (sub)area on a display;
- b) receive a binary input either defining that the (sub)area is to be divided horizontally or defining that the (sub) area is to be divided vertically;
- c) depending on the binary input received in step b), divide the (sub)area either horizontally or vertically into two subareas having a pre-defined area ratio;
- d) repeat steps a) through c) until an input is received indicating that a desired grid has been obtained;
- e) receive multiple inputs assigning at least one data object present in a computer memory to at least one subarea of the grid obtained in step d);
- f) display the assigned data objects in the subareas.

Computer-readable media (transitory or non-transitory, as appropriate) suitable for storing computer program instructions and data include all forms of non-volatile memory, media and memory devices, including by way of example semiconductor memory devices, e.g. erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R. DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

A program software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. In one embodiment, the computer-executable instructions of the present disclosure are written in HTML, TS (TypeScript), and CSS (Cascading Style Sheets). These are particularly suited to handle angular frameworks.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The present disclosure also provides a system, comprising:
- 1) at least one input device;
- 2) at least one display;
- 3) a memory;
- 4) at least one hardware processor interoperably coupled with the at least one input device; the at least one display; and the memory, and configured to
  - a) receive an input selecting an available (sub)area on the display;
  - b) receive a binary input either defining that the (sub) area is to be divided horizontally or defining that the (sub)area is to be divided vertically;
  - c) depending on the binary input received in step b), divide the (sub) area either horizontally or vertically into two subareas having a pre-defined area ratio;
  - d) repeat steps a) through c) until an input is received indicating that a desired grid has been obtained;
  - e) receive multiple inputs assigning at least one data object present in the memory to at least one subarea of the grid obtained in step d);
  - f) display the assigned data objects in the subareas.

In one embodiment, the input device comprises a computer mouse or a trackball. In a further embodiment, the at least one input device comprises a computer keyboard.

In one embodiment, the at least one display comprises a touchscreen. The touchscreen also acts as an input device.

Systems suitable for the execution of the method of the present disclosure can be based on general or special purpose microprocessors, both, or any other kind of CPU. Generally, a CPU will receive instructions and data from a read-only memory (ROM) or a random access memory (RAM) or both. Essential elements of the system are a CPU for performing or executing instructions and one or more memory devices for storing instructions and data. Generally, the system will also include, or be operatively coupled to, receive data from or transfer data to, or both, one or more mass storage devices for storing data, e.g., magnetic, magneto-optical disks, or optical disks. However, the system need not have such devices. Moreover, the system can be embedded in another device, e.g., a mobile telephone, a personal digital assistant (PDA), a game console, or a portable storage device, e.g., a universal serial bus (USB) flash drive, to name just a few.

This disclosure generally describes computer-implemented methods, computer-program products, and systems for generating user interface layouts. The following description is presented to enable any person skilled in the art to make, use and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The details of one or more implementations of the subject matter of this specification are set forth in the accompanying drawings and the description. Other features, aspects, and advantages of the subject matter will become apparent from the description, the drawings, and the claims.

DETAILED DESCRIPTION OF THE DRAWINGS

Figure 1A:
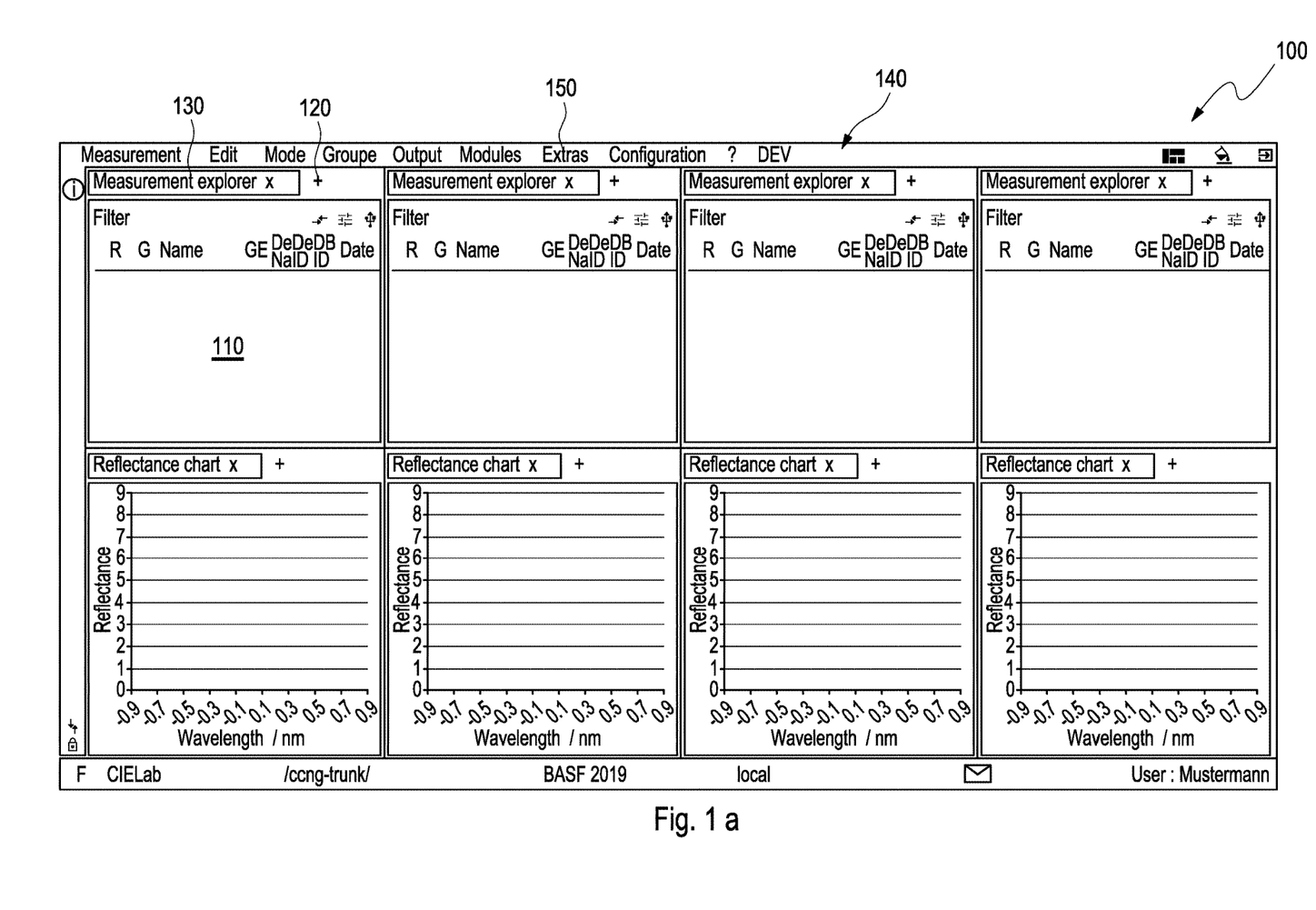
FIG. 1a is an example screenshot of a GUI generated with the method of the present disclosure.

FIG. 1a is a first example screenshot of a GUI 100 generated using the method of the present disclosure. The GUI 100 comprises multiple subareas 110. Exactly one assigned data object is displayed in each subarea 110. A link button 120 is provided in each subarea 110 for selecting the data object to be displayed in the subarea 110. In the embodiment shown in FIG. 1a, an indicator 130 of the type of the data object assigned and displayed is provided in the subarea 110.

A quick start button bar 140 comprising multiple buttons 150 for activating different functions is positioned at the upper edge of the GUI. In the example shown in FIG. 1a, the GUI comprises eight subareas arranged in four columns. While in this example, all subareas are commensurate, this is not mandatory. Also the number of subareas may vary per row and/or column.

Figure 1B:
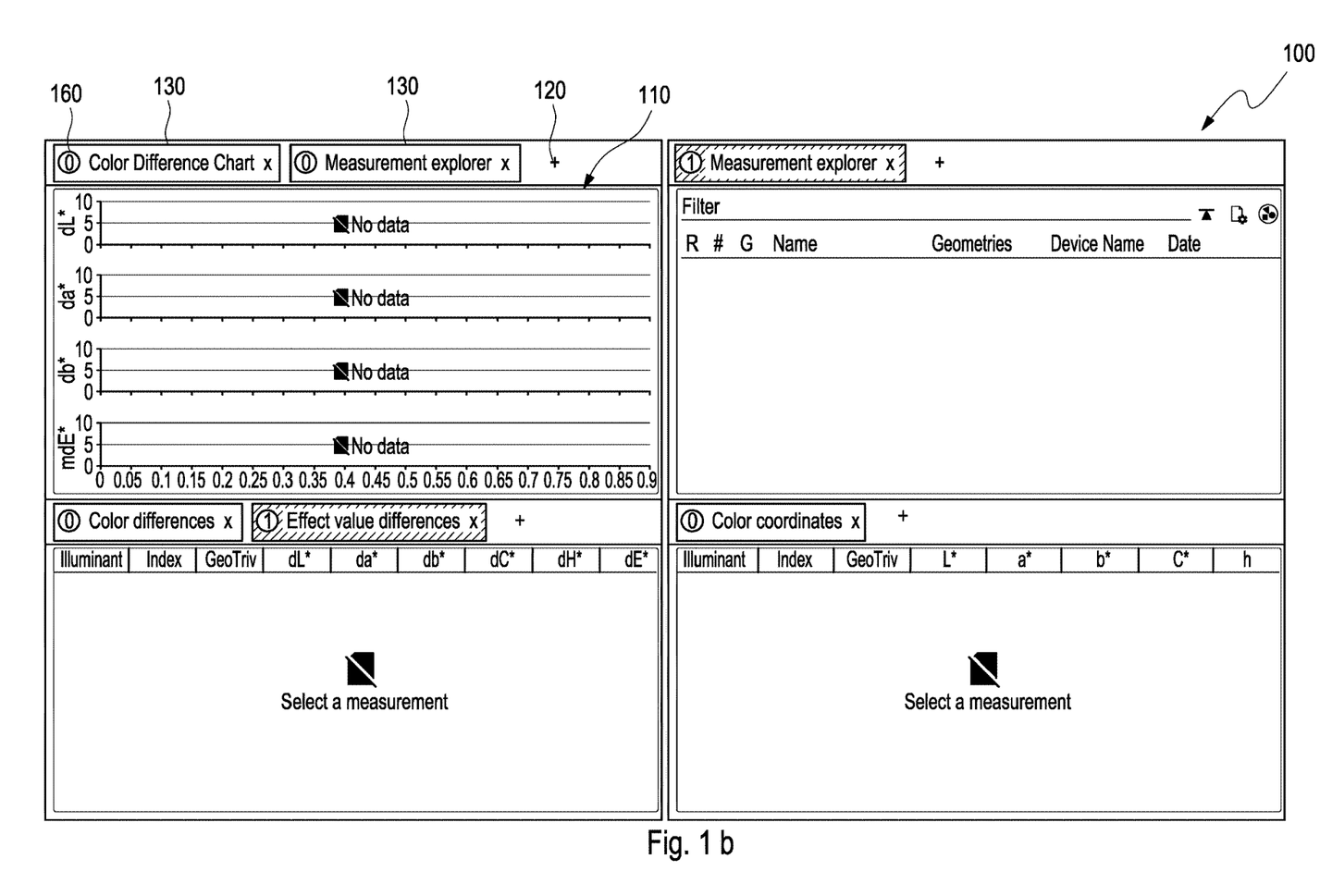
FIG. 1b is another example screenshot of a GUI generated with the method of the present disclosure.

FIG. 1b is another example screenshot of a GUI 100 generated using the method of the present disclosure. The GUI 100 comprises multiple subareas 110. In the top left subarea, two assigned data objects are displayed. Also In the subarea directly below it, two assigned data objects are displayed, while only one assigned data object is displayed in each of the two subareas on the right side of the GUI 100. A link button 120 is provided in each subarea 110 for selecting the data object type(s) to be displayed in the subarea 110. An indicator 130 of the type of the data object assigned and displayed is provided for each assigned data object in each of the subareas 110. In the example shown, the assigned data objects are grouped into two subgroups. Different colors (indicated by different textures in the drawing) and numbers are used to highlight the different subgroups in the GUI 100. The indicator 130 of each assigned data object displays a number 160 and is colored corresponding to the subgroup the assigned data object belongs to.

Figure 2:
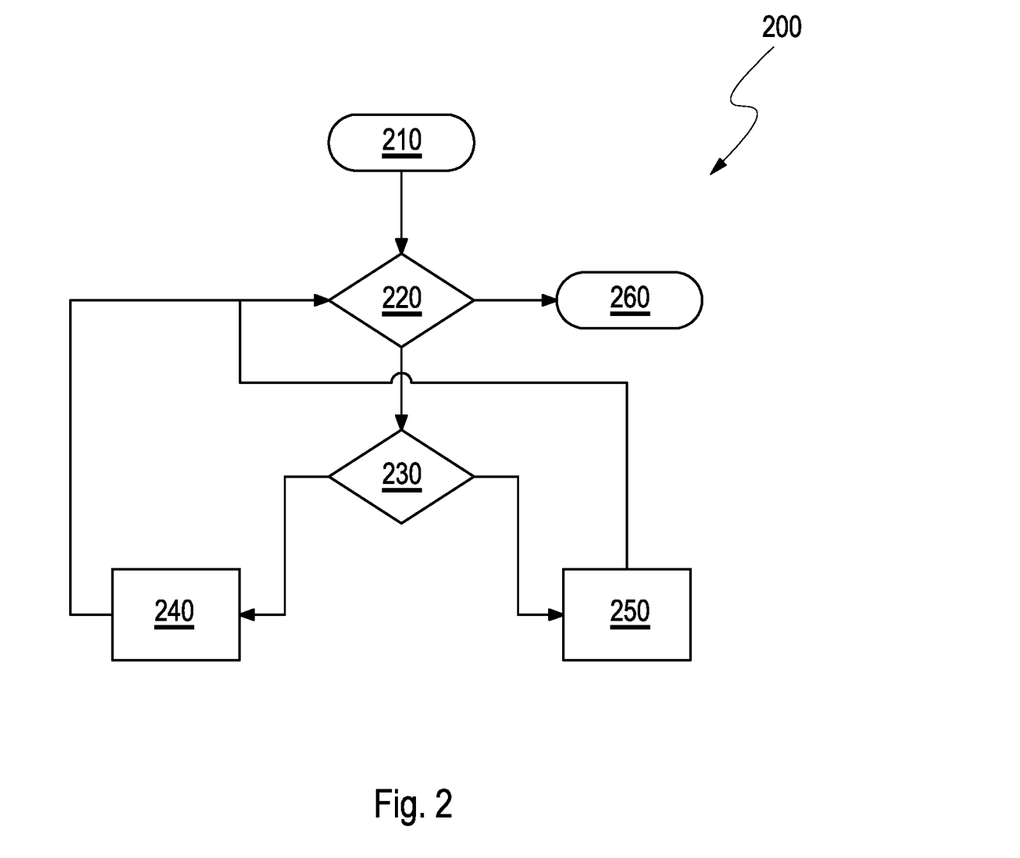
FIG. 2 is a flow chart illustrating some of the steps of the method for generating user interface layouts of the present disclosure.

FIG. 2 is a flow chart 200 illustrating some of the steps of the method for generating graphical user interface (GUI) layouts of the present disclosure. The flow chart 200 shows the recursive portion of the method. After start 210, it is checked in step 220 whether or not there is an input indicating that the procedure has been completed. If such an input is detected, the process is ended 260. Otherwise, on detection of further input, e.g., a mouse-click, a check 230 is performed, which option has been selected for the currently selected (sub)area. On detection of a right mouse-click, the (sub)area is divided vertically 240, while on detection of a left mouse-click, the (sub)area is divided horizontally 250. In another embodiment not shown, the (sub)area is divided vertically 240 on detection of a left mouse-click, while the (sub)area is divided horizontally 250 on detection of a right mouse-click. The process then moves back to step 220.

LIST OF REFERENCE SIGNS

100 GUI
110 subarea
120 data object link button
130 data object type indicator
140 quick start button bar
150 function button
160 subgroup number of data object
200 Flow chart
210 Start
220 Check for input
230 Identify input
240 Divide (sub)area vertically
250 Divide (sub)area horizontally
260 End

The invention claimed is:

1. A computer-implemented method for generating a graphical user interface (GUI) for a dashboard software, comprising steps of:
   a) receiving at least one input selecting an available area or subarea on a display associated with the GUI, the area or subarea being selected by navigating a cursor into the area or subarea using a computer mouse;
   b) receiving binary inputs consisting of selections whether the area or subarea is to be divided horizontally or vertically, each of the binary inputs being a single piece of information which can take one of two expressions: one signifying divide horizontally and another signifying divide vertically, at least one of the selections being made by navigating the cursor into an available area or subarea using the computer mouse and performing a left mouse-click to select horizontal division of the area or subarea and at least one of the selections being made by navigating the cursor into an available area or subarea using the computer mouse and performing a right mouse-click to select vertical division of the area or subarea, or at least one of the selections being made by navigating the cursor into an available area or subarea using the computer mouse and performing the right mouse-click to select horizontal division of the area or subarea and at least one of the selections being made by navigating the cursor into an available area or subarea using the computer mouse and performing the left mouse-click to select vertical division of the area or subarea;
   c) depending on the at least one of the selections made in step b), dividing the area or subarea either horizontally or vertically into two subareas having a pre-defined area ratio;
   d) repeating steps a) through c) until a predetermined grid has been obtained;
   e) assigning at least one data object provided by the dashboard software to at least one subarea of the grid obtained in step d); and
   f) displaying the assigned at least one data object in the subareas.

2. The method according to claim 1, wherein steps a) through c) can be undone or redone as long as no data object has been assigned to the area or subarea.

3. The method according to claim 1, wherein the at least one data object is selected from the group consisting of numbers, text, symbols, tables, diagrams, and pictures.

4. The method according to claim 1, wherein the at least one data object represents measured data obtained by a colorimetry software.

5. The method according to claim 1, wherein boundaries of each subarea of the grid obtained in step d) can be moved to modify the grid, a boundary of a subarea being moved using the computer mouse by pointing and clicking on the boundary to select it and then dragging a pointer to a predetermined position.

6. The method according to claim 1, wherein the grid is storable.

7. The method according to claim 1, wherein the GUI comprises a quick start button bar which can get pinned at an arbitrary position at an edge of the display.

8. The method according to claim 7, wherein the quick start button bar can also float in and float out from the position when it's not pinned.

9. The method according to claim 7, wherein buttons activating different functions can be added and removed to the quick start button bar via drag and drop.

10. The method according to claim 1, which involves steps of:
    g) grouping at least two data objects; and
    h) highlighting the group of data objects with a common color and/or numbering.

11. A non-transitory, computer-readable medium storing computer-readable instructions executable by a computer and operable to:
    a) receive at least one input selecting an available area or subarea on a display, the area or subarea being selected by navigating a cursor into the area or subarea using a computer mouse;
    b) receive binary inputs consisting of selections whether the area or subarea is to be divided horizontally or vertically, each of the binary inputs being a single piece of information which can take one of two expressions: one signifying divide horizontally and another signifying divide vertically, at least one of the selections being made by navigating the cursor into an available area or subarea using the computer mouse and performing a left mouse-click to select horizontal division of the area or subarea and at least one of the selections being made by navigating the cursor into an available area or subarea using the computer mouse and performing a right mouse-click to select vertical division of the area or subarea, or at least one of the selections being made by navigating the cursor into an available area or subarea using the computer mouse and performing the right mouse-click to select horizontal division of the area or subarea and at least one of the selections being made by navigating the cursor into an available area or subarea using the computer mouse and performing the left mouse-click to select vertical division of the area or subarea;
    c) depending on the each of the binary inputs received in step b), divide the area or subarea either horizontally or vertically into two subareas having a pre-defined area ratio;
    d) repeat steps a) through c) until an input is received indicating that a predetermined grid has been obtained;
    e) receive multiple inputs assigning at least one data object present in a computer memory to at least one subarea of the grid obtained in step d); and
    f) display the assigned at least one data object in the subareas.

12. A system, comprising:
    1) at least one input device;
    2) at least one display;
    3) a memory; and
    4) at least one hardware processor interoperably coupled with the at least one input device; the at least one display; and the memory, and configured to perform steps of:
       a) receiving at least one input selecting an available area or subarea on the display, the area or subarea being selected by navigating a cursor into the area or subarea using a computer mouse;
       b) receiving binary inputs consisting of selections whether the area or subarea is to be divided horizontally or vertically, each of the binary inputs being a single piece of information which can take one of two expressions: one signifying divide horizontally and another signifying divide vertically, at least one of the selections being made by navigating the cursor into an available area or subarea using the computer mouse and performing a left mouse-click to select horizontal division of the area or subarea and at least one of the selections being made by navigating the cursor into an available area or subarea using the computer mouse and performing a right mouse-click to select vertical division of the area or subarea, or at least one of the selections being made by navigating the cursor into an available area or subarea using the computer mouse and performing the right mouse-click to select horizontal division of the area or subarea and at least one of the selections being made by navigating the cursor into an available area or subarea using the computer mouse and performing the left mouse-click to select vertical division of the area or subarea;

c) depending on the each of the binary inputs received in step b), dividing the area or subarea either horizontally or vertically into two subareas having a pre-defined area ratio;

d) repeating steps a) through c) until an input is received indicating that a predetermined grid has been obtained;

e) receiving multiple inputs assigning at least one data object present in the memory to at least one subarea of the grid obtained in step d); and f) receiving the assigned at least one data object in the subareas.

* * * * *